(12) United States Patent
Breslow et al.

(10) Patent No.: US 7,617,148 B2
(45) Date of Patent: Nov. 10, 2009

(54) SYSTEM AND METHOD FOR BASKET TRADES AND TRADE ALLOCATION

(75) Inventors: Stuart L. Breslow, Mountain Lakes, NJ (US); John Martin Price, Murray Hill, NJ (US); Ravindra Babu Jasti, Holmdel, NJ (US); Robert K. Laible, Rowayton, CT (US); Leigh Ann Peterson, Pennington, NJ (US); David A. Conner, New Canaan, CT (US); Andrew C. Freeman, Old Greenwich, CT (US)

(73) Assignee: Barclays Capital Inc., New York, NY (US)

( * ) Notice: Subject to any disclaimer, the term of this patent is extended or adjusted under 35 U.S.C. 154(b) by 200 days.

(21) Appl. No.: 11/242,422

(22) Filed: Sep. 30, 2005

(65) Prior Publication Data

US 2006/0069633 A1    Mar. 30, 2006

Related U.S. Application Data

(60) Provisional application No. 60/615,405, filed on Sep. 30, 2004.

(51) Int. Cl.
*G06Q 40/00* (2006.01)
(52) U.S. Cl. ....................................................... 705/37
(58) Field of Classification Search .................. 705/35, 705/36 R, 36 T, 37
See application file for complete search history.

(56) References Cited

U.S. PATENT DOCUMENTS

| | | | |
|---|---|---|---|
| 6,098,051 A * | 8/2000 | Lupien et al. | 705/36 R |
| 6,134,535 A | 10/2000 | Belzberg | |
| 6,278,982 B1 | 8/2001 | Korhammer et al. | |
| 6,615,188 B1 | 9/2003 | Breen et al. | |
| 7,089,205 B1 * | 8/2006 | Abernethy | 705/37 |
| 2003/0069826 A1 * | 4/2003 | Guidi et al. | 705/37 |
| 2004/0039675 A1 * | 2/2004 | Wallman | 705/36 |

OTHER PUBLICATIONS

RealTick User Manual, Townsend Analytics, Ltd., 2004, pp. 1-424.
RealTick by Townsend Analytics, Ltd.; "RealTick User Manual"; 406 pages.

* cited by examiner

*Primary Examiner*—Hani Kazimi
(74) *Attorney, Agent, or Firm*—Morgan, Lewis & Bockius LLP

(57) ABSTRACT

A system and method where a client creates a basket of intended stock orders, slices the basket into one or more waves of orders, sends trade orders to a broker/dealer for execution, and allocates stocks to one or more client accounts. A backend server receives basket or wave orders, breaks each basket or wave order into individual stock orders, and queues the individual stock orders for submission to an order management system for execution of the order. A market data feed to the client continuously updates the information displayed to the client. The client may strike a basket or wave or individual stock by entering strike information into a client database residing on a client computer. The system also provides for allocation of executed trades to client-specified accounts.

8 Claims, 11 Drawing Sheets

| Enter Basket Data | | | |
|---|---|---|---|
| ☑ Apply Template | C:\MyBaskets\NASDAQ-5 ▼ | Select | |
| Name | ND5-0828(a) | (NASDAQ100) | |
| Account | Account-1 ▼ | | |
| | Use this Account for all Entries | | |
| Settlement Type | T+3 ▼ | | |
| Unit Multiplier | 2 ▼ | | |
| Set Side | Buy ▼ | | |
| | Sell | | |
| Names | Sell Short | | |

| Symbol | Base Qty | Actual Qty | Side |
|---|---|---|---|
| CSCO | 100 | 200 | Buy |
| ORCL | 100 | 200 | Buy |
| MSFT | 300 | 600 | Buy |
| SUNW | 300 | 600 | Buy |
| INTC | 200 | 400 | Buy |

SYSTEM AND METHOD FOR BASKET TRADES AND TRADE ALLOCATION

CROSS-REFERENCE TO RELATED APPLICATIONS

This application claims the benefit, under 35 U.S.C. §119 (e), of prior filed U.S. application Ser. No. 60/615,405, filed Sep. 30, 2004, which are incorporated herein by reference in its entirety.

BACKGROUND OF THE INVENTION

1. Field of the Invention

The present invention relates to systems and methods for effecting securities trades. More specifically, the invention relates to computer software and hardware that enables clients to directly work and allocate a trade of a basket of stocks.

2. Description of the Related Art

Automated systems are used by brokerages to reduce the time required to place an order or trade with an exchange. The broker/dealer is usually a member of one or more exchange markets and its traders execute trades in the name of the broker/dealer. The broker/dealer may trade its own portfolio of stocks but it also executes trades for investors that are not members of the exchange market. The broker/dealer may work a basket of stocks manually or automatically using software such as that described in U.S. Pat. No. 6,134,535 issued Oct. 17, 2000 to Belzberg. The system and methods of Belzberg, however, are used by the trader and the broker/dealer client has no control over the program trades made by the trader. Furthermore, Belzberg does not address the problem of allocating the executed trades among more than one account.

The broker/dealer usually has several clients that are institutional investors. Institutional investors usually manage large portfolios of stocks such as, for example, mutual funds, hedge funds, and pension plans. The institutional investors are not members of the exchange markets and use a broker/dealer to place and execute their trades. Moreover, institutional investors usually trade a large group of stocks as a single group. Furthermore, institutional investors may manage several different accounts and must be able to allocate the executed trades to the correct account.

Therefore, there remains a need for systems and methods that allow an investor to create and execute their own trading program and to allocate their trades to their own accounts.

SUMMARY OF THE INVENTION

A system and method where a client creates a basket of intended stock orders, slices the basket into one or more waves of orders, sends trade orders to a broker/dealer for execution, and allocates stocks to one or more client accounts. A backend server receives basket or wave orders, breaks each basket or wave order into individual stock orders, and queues the individual stock orders for submission to an order management system for execution of the order. A market data feed to the client continuously updates the information displayed to the client. The client may strike a basket or wave or individual stock by entering strike information into a client database residing on a client computer. The system also provides for allocation of executed trades to client-specified accounts.

Embodiments of the present invention allow users to monitor and trade baskets of U.S. equities. Orders are generated by slicing waves from activated baskets. Execution performance can be tracked against current market data or previously established strike levels. A dual-level blotter view provides aggregated information about all active baskets in the top half of the display with details on selected baskets or waves appearing in the lower panel.

Basket details generated from other systems can easily be loaded via comma-delimited text files or simply dragged-and-dropped from other programs such as, for example, Microsoft Excel. Interfaces allowing baskets to be uploaded for detailed analysis or imported for trading are provided. User-definable preferences, column configuration, and multi-level dynamic sorting allow the appearance and behavior of the application to be customized to each user's chosen view.

One embodiment of the present invention is directed to a system comprising: a client computer; and a backend server in communication with the client computer, the backend server processing a wave order received from the client computer and directing the processed wave order to an order management system (OMS), the wave order comprising a plurality of stock orders and representing a portion of a basket of stocks stored in the client computer. In some aspects of the present invention, the system further comprises means for allocating the wave order to at least two accounts stored in the client computer.

Another embodiment of the present invention is directed to a system comprising: a client computer; a client database residing on the client computer; one or more computer processors operable to creating a basket of stocks and storing information characterizing the basket in the client database; one or more computer processors operable to slicing the basket into one or more wave orders and storing information characterizing the one or more wave orders in the client database; a backend server configured to receive, process, and forward a wave order from the client computer to an order management system (OMS) and send status information to the client computer. In some aspects of the present invention, the system further comprises one or more computer processors operable to allocating the basket among at least one account and storing information characterizing the allocation in the client database.

Another embodiment of the present invention is directed to a computer-implemented method of client-directed program trade and allocation, the method comprising the steps of: providing a client computer having a basket blotter manager for displaying information to, and receiving information from, a client, a basket store manager for managing the storage and retrieval of basket data from a client database, and a market data cache containing market data for a stock represented in the client database; creating a basket by adding a stock and a quantity to the basket, the basket blotter manager displaying market data retrieved from the market data cache for the stock; slicing the basket into a plurality of wave orders, each wave order identifying a stock in the basket and a wave quantity, wherein a sum of wave quantities over the plurality of wave orders equals the quantity of the stock in the basket; and sending the wave order to a brokerage for execution of the order. In some aspects of the present invention, the method further comprises allocating the stock in the basket to at least two accounts; and storing allocation information in the client database.

BRIEF DESCRIPTION OF THE DRAWINGS

The invention will be described by reference to the preferred and alternative embodiments thereof in conjunction with the drawings in which:

FIG. 5 is an illustration of a user interface displayed to the user in some embodiments of the present invention;

FIG. 6 is an illustration of an execution details window displayed to the user in some embodiments of the present invention;

FIG. 7 is an illustration of a new basket dialog box displayed to the user in some embodiments of the present invention.

FIG. 10 is an illustration of a modify allocation block window displayed in some embodiments of the present invention; and FIG. 11 is an illustration of a basket allocation details window displayed in some embodiments of the present invention.

DETAILED DESCRIPTION

The description herein should be understood to describe only one preferred embodiment of the invention. Those skilled in the art will recognize, for example, that the described embodiment is just one simplified example of the novel system and method of basket trading and trade allocation. The simplified example is all that needs to be described in detail in order to enable the more general system and method that the invention comprises.

Figure 1:
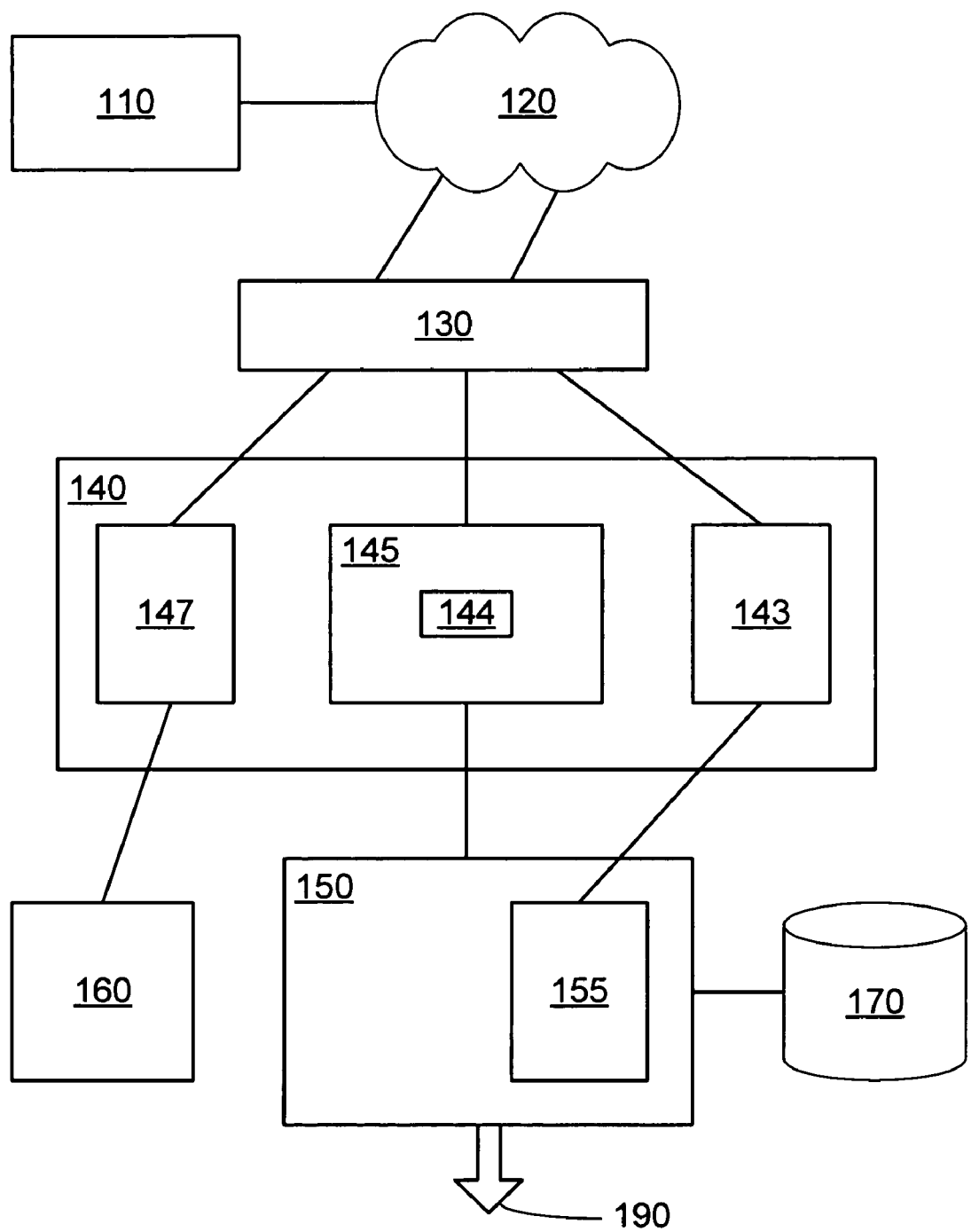
FIG. 1 is block diagram illustrating system components in an embodiment of the present invention.

FIG. 1 is a block diagram illustrating system components in an embodiment of the present invention. In FIG. 1, client computer 110 is connected to a communications network 120 such as, for example, an internet and is routed to a firewall 130 that provides security for the servers 140, 150.

An integration server provides middleware services that include messaging 145, market data feed 147, and address manager proxy 143. Messaging servlet 145 includes token validation 144 that manages security token passing between the client computer 110 and the integration server 140 and is preferably cached in the integration server 140. One or more messaging middleware connections between the messaging servlet 145 and a backend server 150 enable the backend server to handle large volumes of order data. Alternatively, communication between the integration server 140 and the backend server 150 may use http messaging.

A market data servlet 147 manages the client's subscriptions to market data and pushes market data to the client. In a preferred embodiment, a dedicated messaging connection is established between the market data servlet 147 and the client 110 during initialization of a client program after the client logs in. The dedicated messaging connection may be provided by a real-time HTTP messaging framework such as, for example, JTIWeb™ available from Random Walk Computing, Inc. of New York, N.Y. The dedicated connection enables timely market data updates for the client's portfolio. The market data servlet 147 receives market data from a market data feed source 160 such as, for example, Reuters. The market data servlet 147 only pushes market data for the symbols subscribed by the client.

Client subscriptions are preferably managed in the backend server 150 by an address manager 155. The address manager 155 communicates with the client through an address manager proxy servlet 143 in the integration server 140.

Backend server 150 receives and delegates program trading requests to the relevant backend interfaces and manages the queuing of wave orders. The backend server 150 breaks wave orders into single orders and sends the orders to the appropriate order management system (OMS) through a matching OMS interface 190.

A recovery/administrative database 170 stores queued trade orders and executed trade information.

Figure 2:
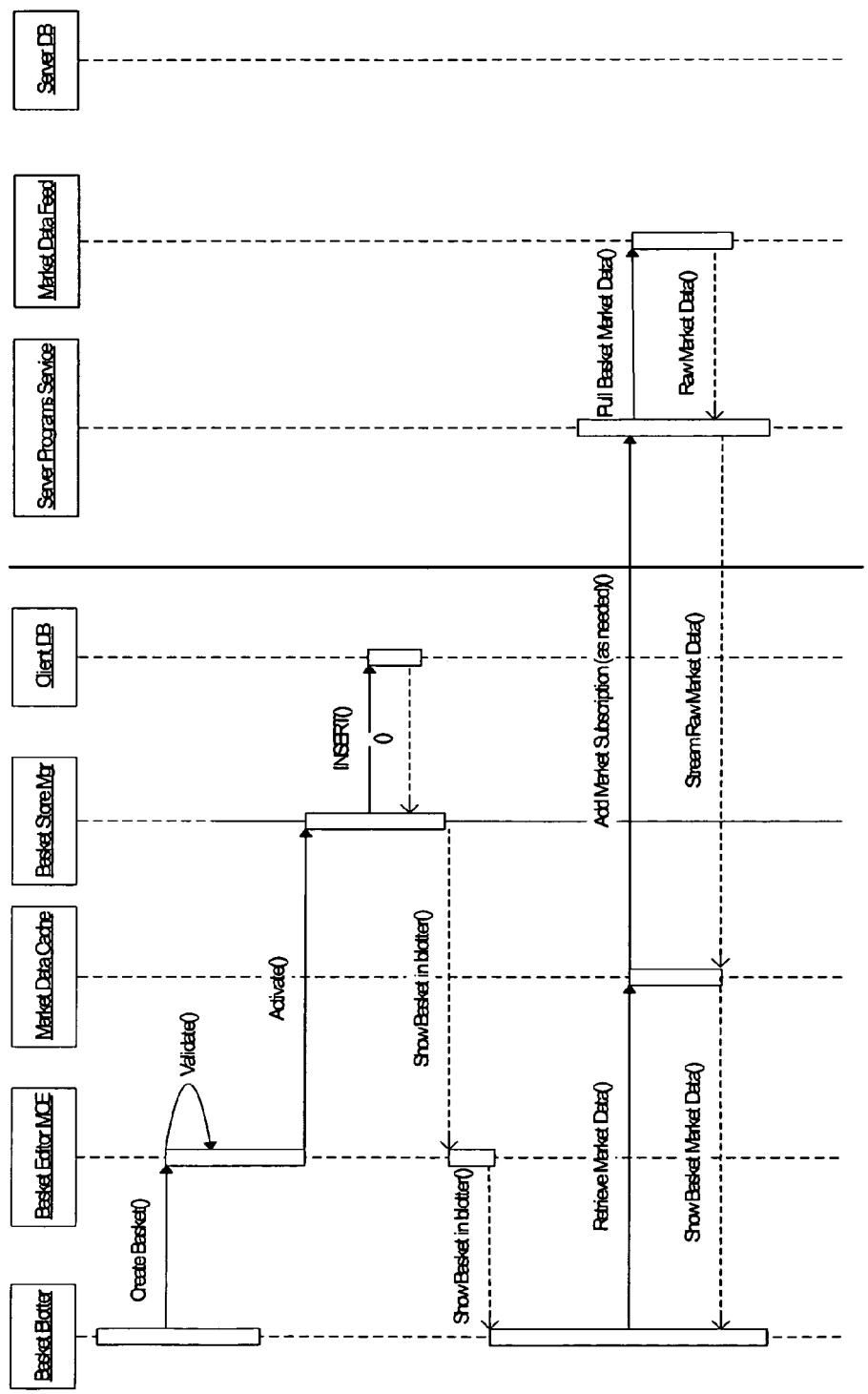
FIG. 2 is a state transition diagram for activating a new basket in an embodiment of the present invention.

FIG. 2 is a state transition diagram for activating a new basket in an embodiment of the present invention. In FIG. 2, each state may be instantiated by a corresponding software module that handles the processing for that state. In a preferred embodiment, five of the software modules reside on the client computer and three of the software modules reside on the backend server. Each of the eight software modules are now described.

A basket blotter module resides on the client computer and presents and populates a main basket blotter to the client when the client clicks on a "Trade Baskets" tab of a Program Trading service. The basket blotter module manages the client computer's graphical user interface (GUI) and displays basket information that is expandable to display wave information in an upper blotter. The basket blotter module displays name information in a lower blotter for the names in the basket or wave selected in the upper blotter. The basket blotter also presents selectable controls that the user may select to perform tasks such as, for example, creating a basket and slicing a basket. In response to a selected control, the basket blotter sends the appropriate requests to the other modules, receives data from the other modules, and updates the blotter to reflect the received information.

A basket editor module resides on the client computer and presents a popup editor screen that shows imported names and quantities. The user enters a basket name and account that are assigned to the collection of names through the basket editor. The user may also modify the names or symbols in the basket. The basket editor validates each name in the basket. As each name is added in the basket editor, the editor sends a request to an Enterprise Security Manager (ESM) to validate the added name. The ESM includes a database of names and symbols used in the exchange markets around the world. The ESM looks up the added name and returns the name and its aliases or alerts the editor that the added name is invalid.

A basket store manager (BSM) maintains the client's basket data and resides on the client computer. The BSM receives requests to update the local data store and passes basket update responses back to the basket editor and/or basket blotter. The BSM acts as an encapsulating layer around the local data store and simplifies the interaction with the client DB I/O layer.

A client DB module resides on the client computer and directly reads, writes, and updates basket data on the client's computer. In a preferred embodiment, the client DB module includes a SQL-based embedded database management system (DBMS). Alternatively, basket data storage may be through an XML interface.

A market data cache (MDC) resides on the client computer and continuously receives updates from the backend server for all the symbols that the client has subscribed to, across all baskets and services (equities and programs).

A programs services module (PSM) resides on a backend server and manages the routing of messages to the appropriate OMS interface. The programs service module receives messages from the middleware (integration) server and routes the message to the appropriate OMS interface according to the content of the message.

A market data feed module resides on a backend server and manages the receipt and distribution of a market data feed such as, for example, the Reuters market data feed.

A server DB resides on a backend server and manages and stores all orders sent to the OMS interfaces.

In FIG. 2, the user begins the creation and activation of a new basket by selecting the appropriate control in the main basket blotter. The basket blotter module sends a CreateBasket request to the basket editor module, which displays a popup window where the user can enter new basket information such as, for example, a basket name and account. As the user enters a new name to the basket, the basket editor validates the name against ESM. If the entered name is valid, ESM returns the name and aliases to the editor. After the basket information has been entered and validated, the user clicks on the Activate button in the editor. The editor sends an activate request to the basket store manager. The basket store manager issues an insert request to the client DB module, which stores the basket information in the client DB. After storing the new basket, the client DB returns an acknowledgement to the basket store manager. The basket store manager sends an acknowledgement to the basket editor. The basket editor issues a request to the basket blotter module to add the new basket to the basket display.

After the new basket has been stored in the client DB, the basket blotter issues a request to the MDC to provide market data for the names in the new basket. If the user has activated other baskets containing some or all of the same symbols in the new basket, the market data may be retrieved directly from the MDC. If a symbol in the new basket is not already in the MDC, the MDC issues a request to the PSM to add the most recent data for the new symbol to the MDC. The PSM sends a request to the market data feed module to return the most recent data for the new symbol. The market data is then streamed to the MDC, which passes the data to the basket blotter module for display to the user. After a basket is created and activated, the main basket blotter displays the basket entry, which receives streamed market data updates.

Figure 3:
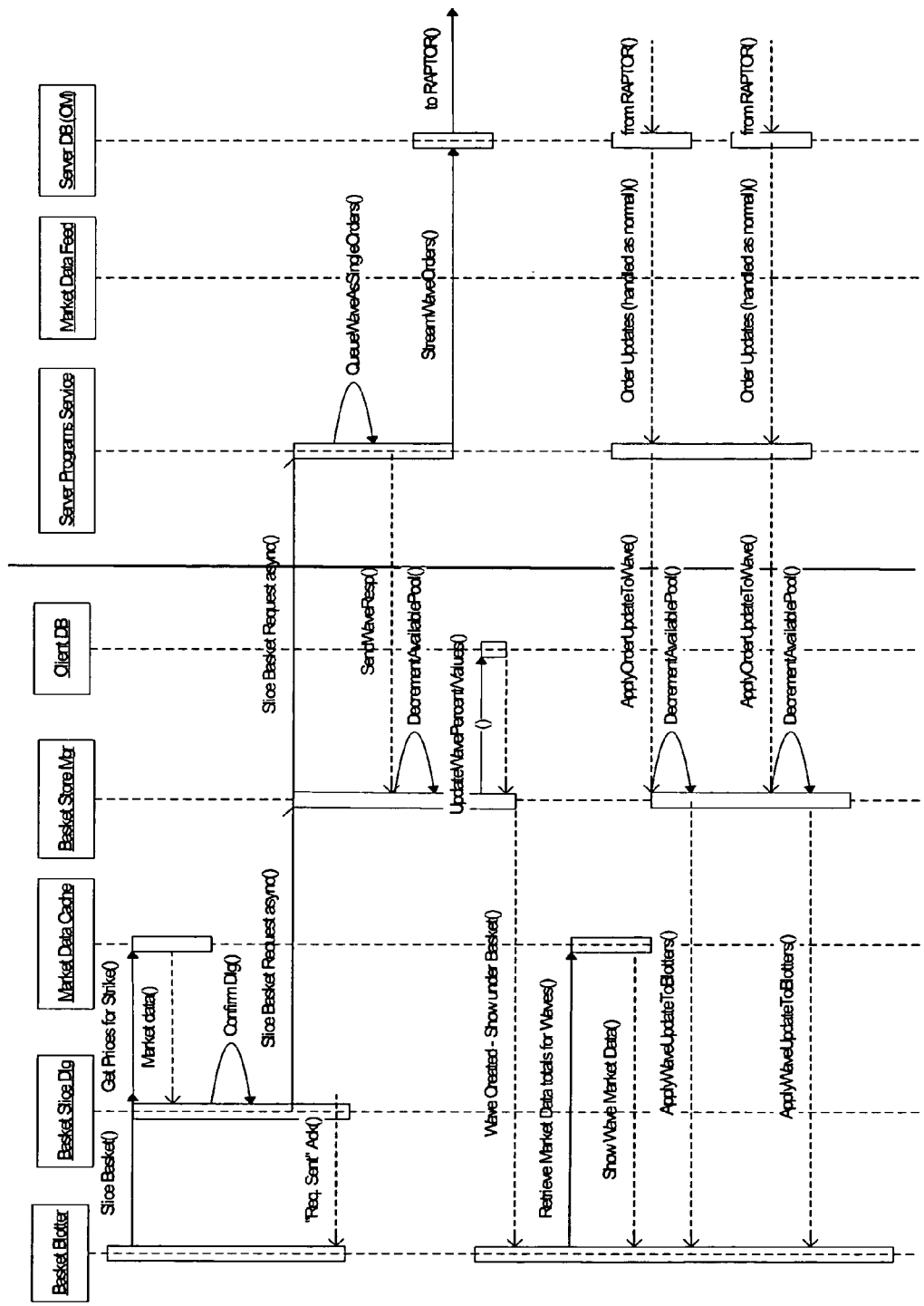
FIG. 3 is a state transition diagram for slicing a basket in an embodiment of the present invention.

After a basket is activated, the user may slice the basket into waves. Each wave is then sent for order execution. Sending smaller orders over a time period may reduce the market impact of sending a single large order to the market. FIG. 3 is a state transition diagram for slicing a basket in an embodiment of the present invention. The user may slice a basket by preferably right clicking on a basket displayed by the basket blotter manager. In response, the basket blotter manager sends a Slice Basket request to a basket slice dialog manager (BSDM), which pops up a window that allows the user to enter slice details. The user may slice the entire basket into waves where each wave has the same percentage of each name. Alternatively, the user may create an ad hoc slice by selecting one or more individual names in the lower blotter and clicking a "Slice" option. The BSDM sends a request to the MDC to retrieve current prices for each name in the basket and presents a confirm dialog to the user to confirm the order type and limit values for each name in the wave. Once the wave details are entered and confirmed, the user may send a wave for execution. The BSDM sends a Slice Basket request to the BSM. The BSM sends a message to the PSM to send the wave for execution. The BSM breaks the wave request into single orders and queues each single order for execution. The BSM stores the orders in the server DB and sends the orders to the appropriate OMS interface for execution. The BSM sends a response to the BSDM confirming the queuing of the orders. The BSM updates the Client DB to reflect the state of the queued wave and sends the updated information to the basket blotter manager for display to the user. Updates of order status received through the OMS interface are stored in the server DB and are published by the programs services manager to the BMS to the basket blotter manager. The basket blotter manager displays the updated status in the name (lower) blotter and includes the % complete for each name. Totals for each name, wave, and basket are updated to reflect the updated % complete data.

A user may cancel and/or replace a wave of orders or an individual order that has been submitted but not yet executed. A basket cancel/replace cancels or replaces all outstanding orders in the selected basket. A wave cancel/replace cancels or replaces all outstanding orders in the selected wave(s). A name cancel/replace cancels or replaces all outstanding orders across all active baskets for the selected name(s). The user can cancel all current outstanding orders across all baskets by selecting a "Cancel All" control. The user may modify the quantity, order type, limit price, and/or side of an order. Once cancel requests are fulfilled, the quantities that were associated with the cancelled orders are returned to the sliceable pool.

Figure 4:
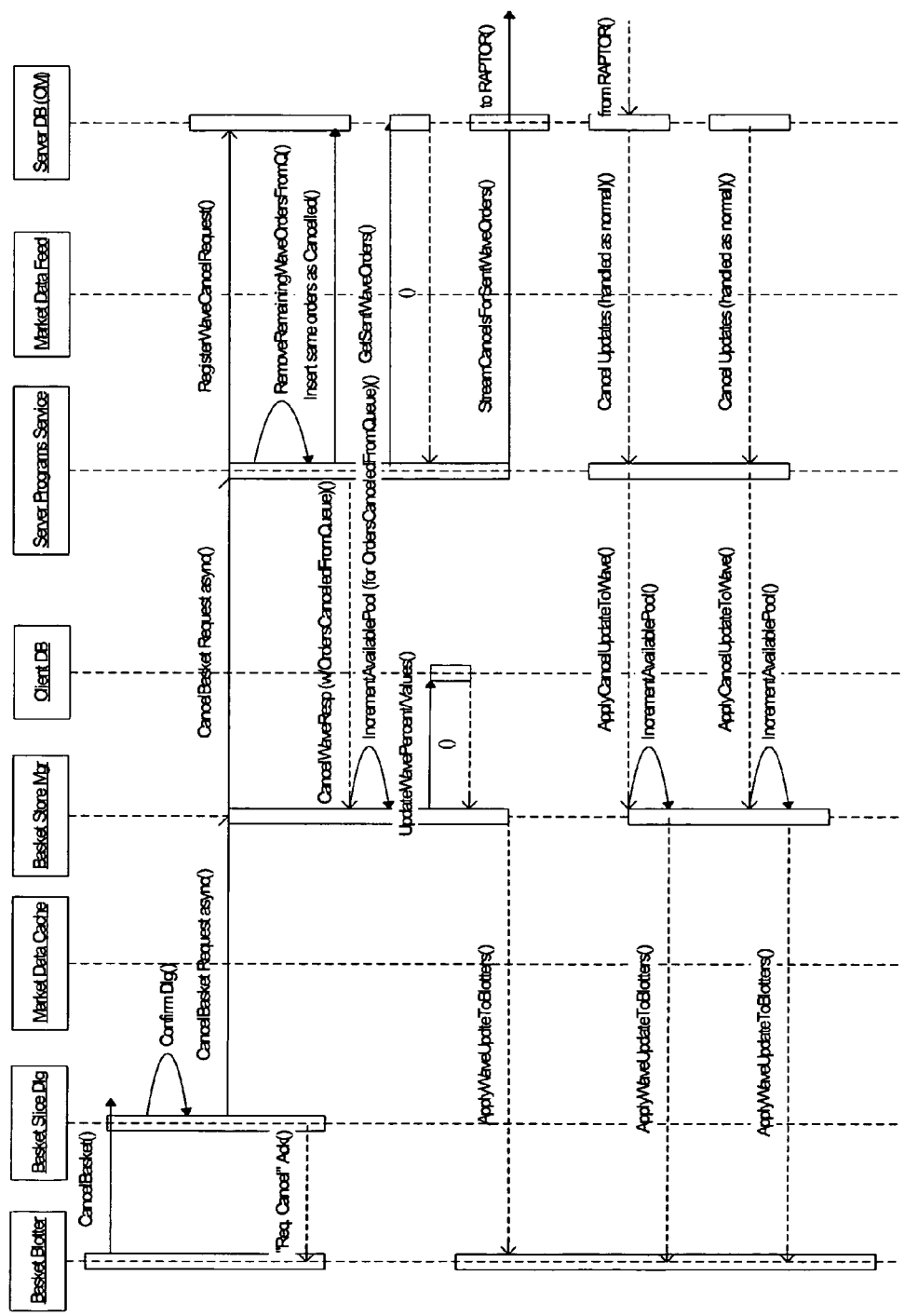
FIG. 4 is a state transition diagram for a wave cancellation in an embodiment of the present invention.

FIG. 4 is a state transition diagram for a basket cancellation in an embodiment of the present invention. In FIG. 4, the basket blotter manager sends a Cancel Basket request to the BSDM when the user clicks on one of the cancel buttons in a programs toolbar. The BSDM displays the basket slice dialog window where the user confirms the cancel request. After confirmation, the BSDM sends a cancel request to the BSM and the BSM sends a cancel request to the PSM. The PSM determines the waves comprising the cancelled basket and saves the cancel requests for each wave to the server DB. The PSM removes the remaining wave orders in the queue and updates the server DB to indicate that the removed queued waves are cancelled. The PSM sends a cancel wave response for each wave removed from the queue to the BSM. The PSM also queries the server DB to identify the wave orders that have already been sent for execution to the OMS and sends a cancel request for those wave orders. Order updates from the OMS are stored in the server DB and sent to the PSM. The PSM updates the BSM, which manages an order cancel list that is sent to the basket blotter module that updates the blotters displayed to the user.

Figure 5:
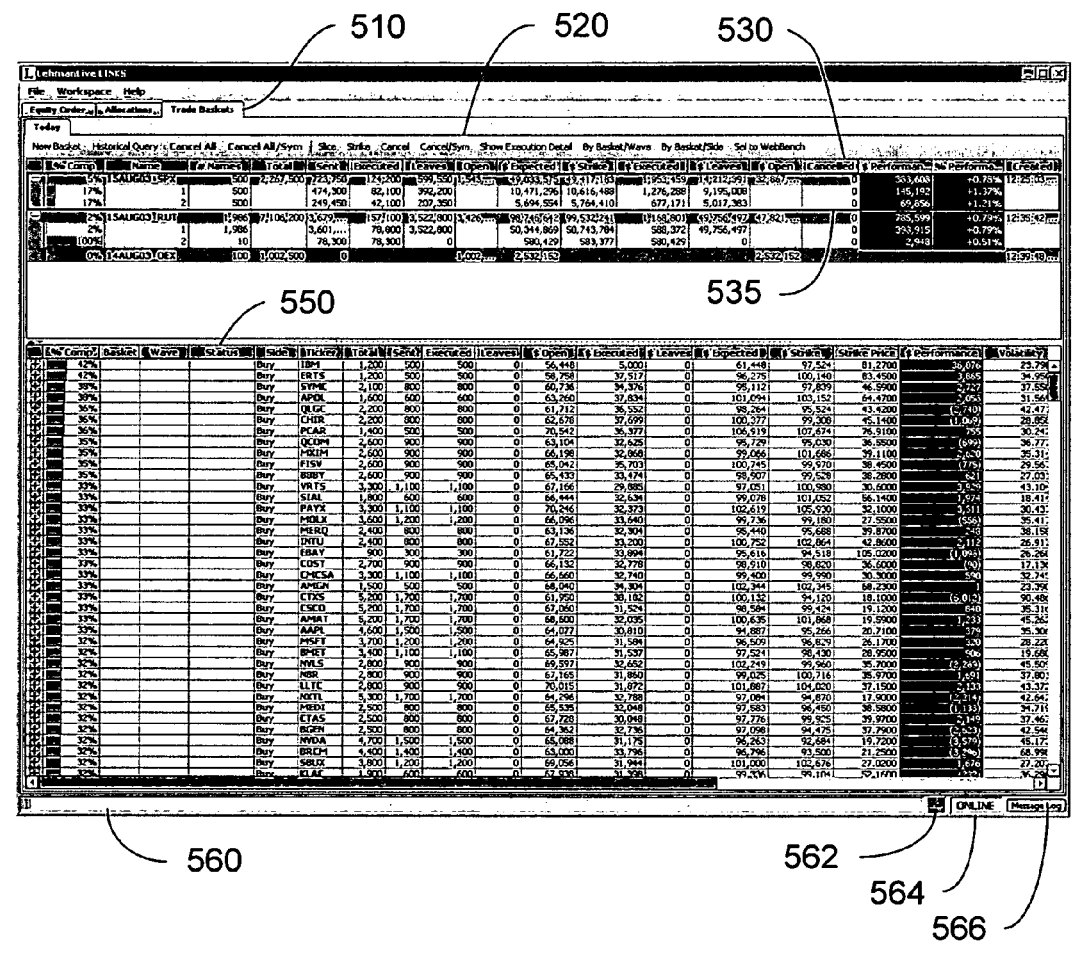

FIG. 5 is an illustration of a user interface displayed to the user in some embodiments of the present invention. The interface includes service selection tabs 510 that select a service. In FIG. 5, three services may be selected by the user: equity order for placing individual orders; allocation for allocating the stocks in a basket trade into individual accounts; and basket trade for trading a group, or basket, of stocks. A programs toolbar 520 is displayed below the service selection tabs 510 and allow the user to quickly select an action. Different actions may be displayed on the programs toolbar 520 depending on the selected service tab. A status message area 560 provides status information to the user and may include a market data status indicator 562 to indicate that the program is receiving market data updates. A connection status indicator 564 indicates whether the client is successfully connected and can send orders and receive execution updates. A message log 566 may be selected by the user to display a history of the messages displayed in the status message area 562.

An upper blotter 530 displays the activated baskets and displays aggregate information about the basket. Drill-down details are indicated by a plus (+) sign at the left of the basket's row and may be displayed by clicking on the plus sign. The contents of the detailed rows may be selected by clicking on control buttons in the programs toolbar. When the user clicks on the "By Basket/Wave" button, a detail row is added for each wave and shows the part of the basket totals attributable to that wave. When the user clicks on the "By Basket/Side" button, the detail row displays a breakdown of basket values by side of the market and displays the contribution to the basket totals by Buy and Sell orders.

Table 1 describes the columns that may be displayed in the basket aggregate view.

TABLE 1

Basket Aggregate View Column Definitions

| Column | Value Definition |
|---|---|
| Name | User assigned basket name |
| % Comp | Percentage of total quantity executed |
| # Names | Number of individual names in basket |
| Total | Total share quantity |
| Open | Share quantity not yet sliced |
| $ Open | Dollar value of Open shares using current bid/offer. |
| Sent | Share quantity sent for execution |
| Leaves | Share quantity sent but not yet filled |
| $ Leaves | Dollar value of Leaves shares using current bid/offer. |
| Cancelled | Number of shares cancelled by user |
| Rejected | Number of shares in rejected orders |
| Executed | Number of shares filled |
| $ Executed | Dollar value of filled shares |
| $ Expected | Value using execution price for fills and current bid/ask for Open and Leaves. |
| $ Strike | Value of Total shares using strike price |
| $ Performance | $ Strike - $ Expected |
| % Performance | $ Strike - $ Expected expressed as a percentage of $ Strike. |
| Created | Date/time of basket creation |

A lower blotter, Basket/Wave Details View, 550 displays the detailed information associated with the selected basket in the upper blotter, indicated by a bold border 535. If more than one basket is selected in the Basket Aggregate View, the Basket/Wave Details View displays the total order quantities for the selected items aggregated by symbol. The Basket/Wave Details View displays information on the execution of the basket or wave. The user may expand the details by clicking on a plus (+) sign to the left of each row to show order information for each wave. Table 2 describes the columns that may be displayed in the Basket/Wave Details View.

TABLE 2

Basket/Wave Details View Column Definitions

| Column | Value Definition |
|---|---|
| Basket | User assigned basket name |
| Wave | Sequential number of wave per basket |
| % Comp | Percentage of total quantity executed |
| Side | Side of market (Buy, Buy to Cover, Sell, Sell Short) |
| Ticker | Ticker symbol for name (Bloomberg) |
| Total | Total share quantity (name level only) |
| Open | Share quantity not yet sliced (name level only) |
| Order | Share quantity of orders (includes cancelled shares) |
| Sent | Share quantity sent for execution (excludes cancelled shares) |
| Limit Price | Limit price for order (order level only) |
| Status | Execution status of order (order level only) |
| Leaves | Share quantity sent but not yet filled |
| Cancelled | Number of shares cancelled by user |
| Rejected | Number of shares in rejected orders |
| Executed | Number of shares filled |
| Avg. Gross Price | Average gross execution prices across selected orders |
| Order ID | broker/dealer tracking number |
| Order Type | Order style (Market, Limit, et al) |

TABLE 2-continued

Basket/Wave Details View Column Definitions

| Column | Value Definition |
|---|---|
| Entry Time | Time of last trade |
| Bid Size | Size of current bid |
| Bid | Current bid price |
| Offer | Current offer price |
| Offer Size | Size of current offer |
| Mkt | Side-dependent bid or offer price (offer for buys, bid for sells) |
| Mkt Size | Side-dependent market size (offer for buys, bid for sells) |
| Last | Last trade price |
| Last Size | Size of last trade |
| Tick | Direction of last price movement |
| Change | Day's change from opening price |
| Open Pr | Opening price for current trading day |
| Prior Close | Closing price on previous trading day |
| High | Current trading day high price |
| Low | Current trading day low price |
| Volume | Trading volume for current trading day |
| Avg Daily Volume | 20-day average trading volume |
| Liquidity | Order quantity as a percentage of ADV |
| % Today | Order quantity as a percentage of today's volume |
| Mkt Impact | Predicted market movement in response to trade orders |
| Volatility | 30-day weighted average volatility |
| $ Expected | Value using exec. price for fills and current bid/ask for Open and Leaves |
| $ Executed | Dollar value of filled shares |
| $ Open | Dollar value of Open shares using current bid/offer |
| $ Leaves | Dollar value of Leaves shares using current bid/offer |
| Strike Price | Target price |
| $ Strike | Value of total shares using Strike price |
| % Chg vs Strike | % difference between Last price and Strike price |
| $ Performance | $ Strike - $ Expected |
| % Performance | $ Strike - $ Expected as a percentage of $ Strike |
| Company Name | Full name of share issuer |
| RIC | Reuters Information Code for security |
| CUSIP | Committee on Uniform Securities Identification Procedures number |
| SEDOL | Stock Exchange Daily Official List number for security |
| ISIN | International Securities Identification Number for security |
| BBN | Bloomberg security identifier |
| Exchange | Listed or OTC |
| Sector | Sector classification for symbol |
| Industry Group | Industry classification for symbol |
| Industry Subgroup | Industry subgroup classification for symbol |
| Mkt Data Updated | Last update time for market data information |
| Last Time | Time of last trade |
| External | Indication of unsolicited modification or cancellation |

The user may modify the columns displayed and their order in either blotter by right-clicking anywhere in the appropriate blotter and selecting a "View→Show/Hide Columns" item from a context menu. The user may select the columns to display and order the columns in a column selection window. Alternatively, the user may change the display order of a selected column by dragging and dropping a column header to the desired position. The user may hide a displayed column by right-clicking on the column header, which presents the user with the option of hiding that column.

Data in each blotter panel may be sorted by left-clicking on a column header. A default sort order is ascending although a descending sort order may be selected by holding down the <Shift> key while clicking on the column header. In a preferred embodiment, a small triangle is displayed in the column header that indicates the sort that is in effect. A multi-level sort may be performed by holding down the <Ctrl> key while clicking on a subsequent column and a number is placed in the header indicating the precedence of the sort keys. A "Dynamic Sort" may be selected from a context menu that resorts the blotter after each data update to maintain the specified sort.

Figure 6:
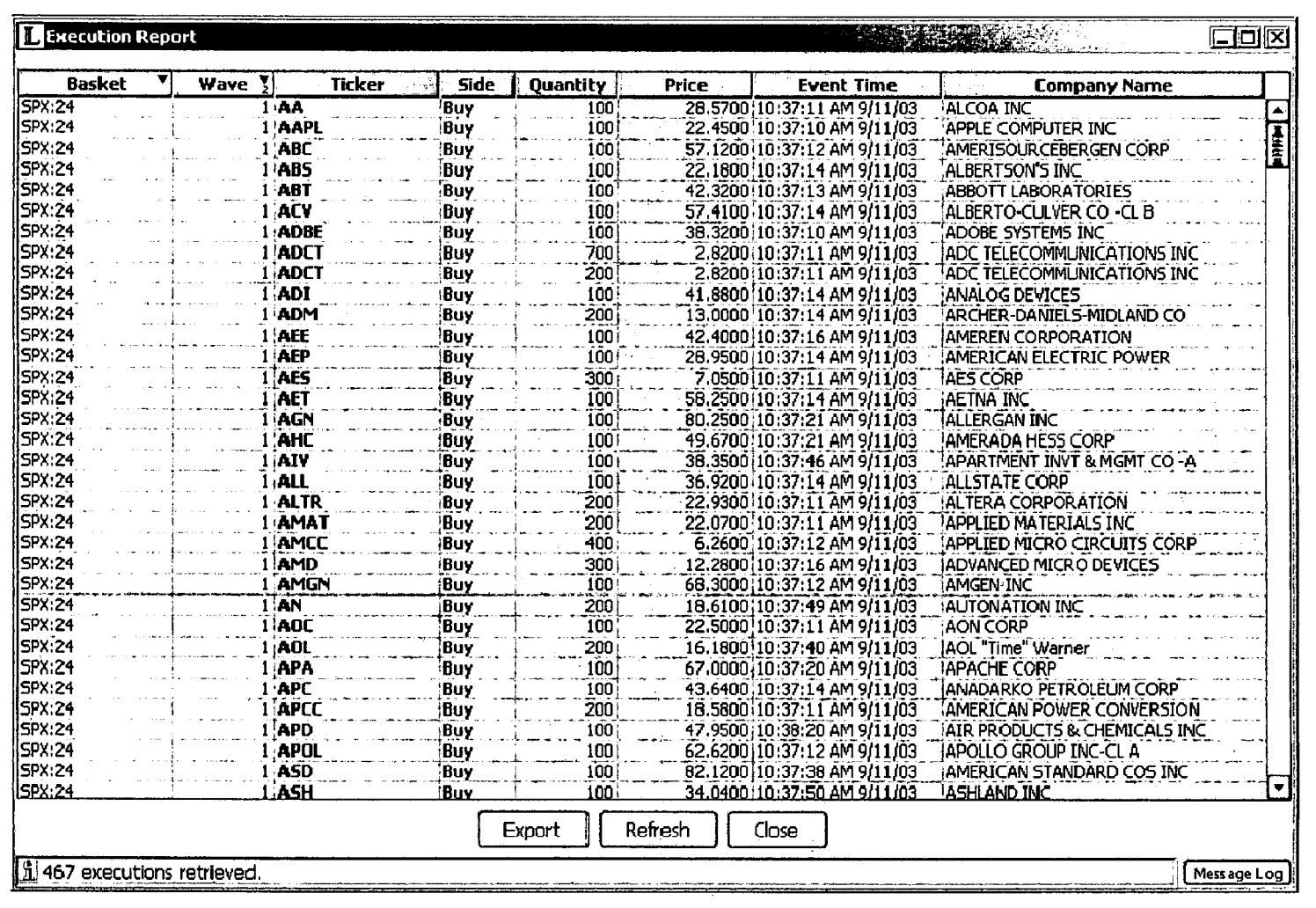

FIG. 6 is an illustration of an execution details window displayed to the user in some embodiments of the present invention. Individual fill details for orders may be viewed by clicking a "Show Execution Detail" button on the programs toolbar to view the execution details window. Execution data is displayed based on the current selection in the Basket Aggregate view. Executions may be shown for a single wave or side, a single basket or any combination reflected by multiple selections. The user may click on the "Export" button in the execution details window to export the contents of the window to an Excel-compatible csv file.

A new basket may be created using a new basket wizard by clicking on the "New Basket" button on the programs toolbar 520. A new basket may be created by loading from a file, by generating a residual from the previous day's orders, by a template, or by manual input.

Basket order information may be loaded preferably from comma-delimited (csv) files that can be produced by most spreadsheets and many third-party applications. The only required fields in the csv files are Symbol and Quantity where Symbol identifies the security and Quantity represents the number of shares. A negative Quantity may be interpreted as a sell order and a positive Quantity may be interpreted as a buy order.

A residual basket may be created from a previous day's unexecuted program by selecting the residual method in the new basket wizard. The wizard prompts the user to select a date on which to base the residual basket.

A new basket may be created from a pre-existing basket template. The basket template may be stored as a csv or xls file. FIG. 7 is an illustration of a new basket dialog box displayed to the user in some embodiments of the present invention. In FIG. 7, an Apply Template check box allows the user to specify a template for the new basket. A drop-down box displays pre-existing templates that the user may use to create the new basket. The name and account field in the dialog box is pre-populated with the name and account of the selected template. The user may change the name and account by entering the information in the appropriate field. A unit multiplier may be applied to the new basket and multiplies the quantities in the template to set the quantities for the new basket. A set side drop-down box enables the user to over ride the template sides by setting each of the orders in the template to the specified side. A names table is pre-populated by the names of the template. The user may modify individual names, actual quantities, or sides by entering the information directly into the names table.

The new basket wizard displays a pop-up Basket Editor when selected where the user can manually enter new basket information and name the basket. The Basket Editor is also used to modify basket information, as needed, regardless of the method of basket creation. A summary grid displays information about the number of names and total shares for buy and sell orders, respectively. Strike values are summarized only if all names have been supplied with a strike price. Order information may be entered using any of the available symbol types and symbol types may be mixed within a single basket.

After the new basket information has been entered, the basket is activated by clicking on the Activate button in the Basket Editor. Activation adds the basket to the blotter display after validating the uniqueness of the basket name for the current trading session, validating the symbol information and subscribing to market data and analytic information for the basket's contents. An optional account number that is attached to each order generated from the basket may be supplied during basket activation. If any of the rows in the basket entry window cannot be validated, the row may be highlighted and displayed in red at the top of the entry window so that the user can edit or cancel the row. If the basket contains duplicate symbols on the same side of the market, the user is prompted to automatically aggregate the duplicates into a single record. If the duplicate symbols cannot be merged because, for example, they are different sides or symbol types, an error is generated and the problem rows are displayed and sorted to the top of the window.

A target or strike price may be applied to each activated basket. The strike price may be used as a benchmark to measure execution performance in the programs blotter. The strike price for each name in a basket may be imported or input at the time the basket is created. To strike a currently active basket, the user may select the basket in the Basket Aggregation view 530 and click the "Strike" button on the Programs Toolbar.

A summary grid displays the number of buys and sells in the basket and the share quantities for each along with any existing strike value. The summary grid changes to reflect the selected strike method and displays the resulting basket aggregate when the user selects any of the available market data elements to calculate the basket strike. If, for any reason, market data for any of the names in the basket is unavailable, the value field will show "N/A" and an error message is displayed to indicate the number of missing items but the user will still be allowed to strike using the data that is available. If all names in the basket do not have an associated strike value, no aggregate data is displayed in the strike column or in any column derived from the strike value in order to avoid misrepresenting performance measures in the program blotter.

The basket represents a trading program and the user may specify how the orders are sent to the market by "slicing" the basket into waves of orders. A slice across the whole basket may be created by clicking the "Slice" button on the programs toolbar. Alternatively, a subset of the basket may be sliced within the basket details blotter 550 by selecting the individual names to be sliced and using a context menu of the details blotter to select "Slice Selected."

Figure 8:
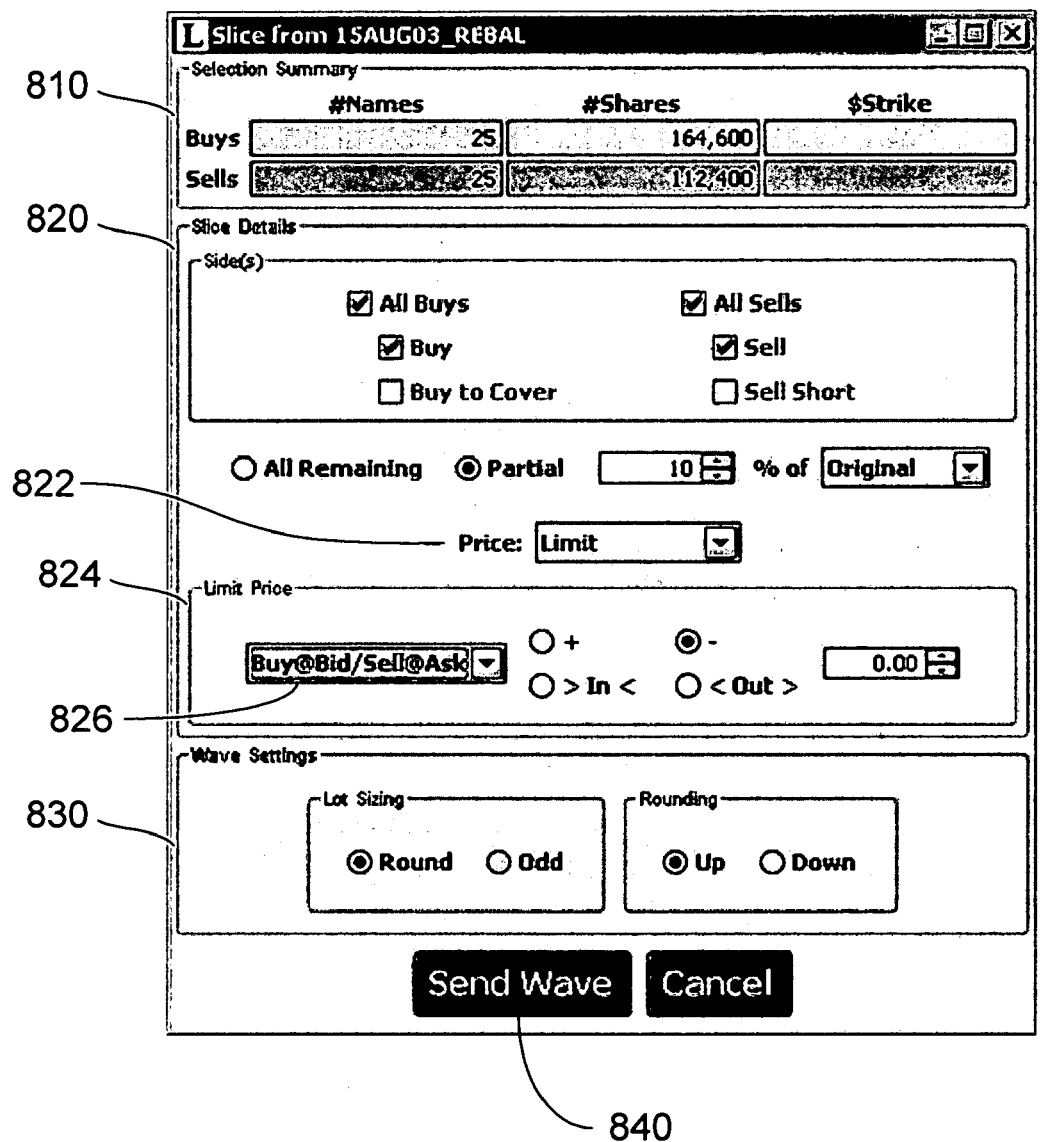
FIG. 8 is an illustration of a slice dialog displayed to a user in some embodiments of the present invention.

FIG. 8 is an illustration of a slice dialog displayed to a user in some embodiments of the present invention. A summary grid 810 displays information on the selected orders. A slice details 820 displays parameters that the user may enter or modify for the selected slice. Only sides that are present in the selected basket are enabled. The user may specify a partial quantity to slice expressed as a percentage of the original basket quantities, a percentage of the share quantities remaining open, or as a target percentage to complete. Alternatively, the user may select "All Remaining" to finish the basket. A wave settings display 830 allows the user to specify how each lot is rounded. If lot sizing is set to "Round", quantities are rounded to multiples of the designated "round lot" size for that security. The rounding direction, up or down, may be selected by the user.

The user may select whether the waves are sent as market or limit orders by selecting the appropriate method in the "Price" setting 822. If a limit pricing method is selected, the user specifies how the limit price for each order will be calculated by setting the appropriate parameters in the "Limit Price" display 824. A drop down box 826 allows the user to select a data value used to base the limit price for each order. The data value choices may include market data fields as well as previously established strike price. Baskets with order on both sides of the market can be priced by calculating the buys from the current bid price and the sells from the current offer price or vice-versa. The user may also specify an offset to increment or decrement the limit by selecting the "+" or "−" radio button, respectively, and selecting an increment value. If the basket contains orders on both sides of the market, the user may choose to offset both buys and sells in the same direction through the selection of either "+" or "−" radio buttons or move prices inside or outside the market by selecting the ">In<" or "<Out>", respectively.

After all data fields have been entered and validated, a "Send Wave" button 840 is enabled and allows the user to submit the wave. After the wave is sent, the basket details blotter 550 displays the details of the wave and reports progress on the execution of the constituent orders.

Outstanding program orders may be cancelled using global or selection-based methods provided on the programs toolbar. A "Cancel All" button on the programs toolbar allows the user to cancel all open and pending orders across all baskets. A "Cancel All/Sym" button on the programs toolbar prompts the user for a symbol and cancels all orders for that symbol across all baskets. A "Cancel" button on the programs toolbar enables the user to cancel all order for a selection in the basket aggregate view. All orders in the selected basket(s), wave(s), or side(s), depending on the current view configuration of the aggregate view are cancelled. A "Cancel/Sym" button prompts the user for a symbol and cancels all order for that symbol found within the selected basket(s), wave(s), or side(s) in the basket aggregate view. Alternatively, a user may right-click in the basket aggregate view to bring up a context menu where the user may select the same cancel operations as provided in the program toolbar.

An order or wave may be modified after the order is sent but prior to its full execution or cancellation through a Replace function. The user may modify a wave by selecting a wave and selecting "Replace" from a context menu. A wave replace dialog is displayed that enables the user to change the order type and, for limit orders, the limit price. The user may modify an order by selecting an order and selecting "Replace" from a context menu. An order replace dialog is displayed that enables the user to change the order type, the limit price, limit price controls.

The user may view order activity for past trading days by selecting a "Historical Query" button on the programs toolbar. In a preferred embodiment, basket information for the past 30 trading days are maintained on the user's local computer. In order to protect the confidentiality of pre-trade information, no data is sent to Lehman regarding the total quantities reflected in a basket. If a query older than 30 days is selected, the user may see the executed trade information but total basket quantities will only reflect the executed portion of the basket. In a preferred embodiment, historical information is read-only and no trades may be modified or otherwise acted upon. If a query is less than 30 days, a "Create Residual" button is added to the programs toolbar. Clicking the "Create Residual" button enables the user to quickly create a new basket composed of the unfinished quantities from the selected historical basket.

Selecting an "Allocations" service selection tab enables the user to submit equity trading account allocation details for settlement through the broker/dealer. The allocation process includes creating allocation blocks, entering allocation details, and submitting the allocation information to the broker/dealer.

Figure 9:
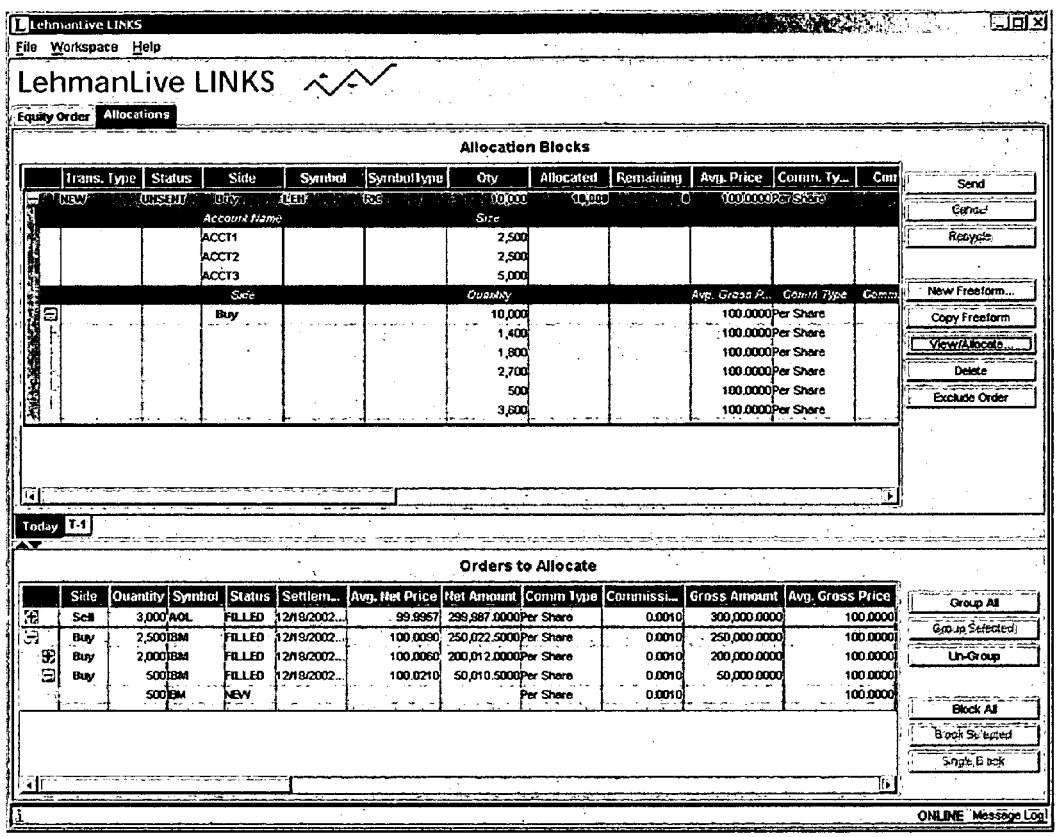
FIG. 9 is an illustration of an allocations window displayed to the user in some embodiments of the present invention.

FIG. 9 is an illustration of an allocations window displayed to the user in some embodiments of the present invention. In FIG. 9, the top portion of the display is a block allocation blotter that displays block information such as symbol (ticker, RIC, etc.), side (buy/sell), quantity, trade date, settlement type, settlement date, average price, commission type, and commission value. All allocations, regardless of state, are displayed in the block allocation blotter. The "Trans. Type" column indicates whether the allocation block is in a New or Cancel condition. A "Status" field indicates whether the block action is Unsent, Sent, or Received. A Sent status indicates that the allocation has been sent but not yet received by the broker/dealer. A Received status indicates that the broker/dealer has received the instructions (orders) in the block, whether the block is new or cancelled. Table 3 lists and describes the data elements associated with the block allocation blotter.

TABLE 3

| FIELD NAME | FUNCTIONALITY |
| --- | --- |
| Symbol | Identifies traded security by Symbol and Symbol Type. Both |
| Symbol Type | fields are non-mutable and should come from Order description. Non-mutable fields. |
| Side | Buy (Buy and Buy−), Sell (Sell and Sell+) and Sell Short (Sell Short and Sell Short Exempt). |
| Quantity | Quantity field: total # of shares of a block trade. |
| Exchange | Reuters Market Mnemonics. E.g. NYS for NYSE. |
| Avg. Price | Price per share - either Average Price for multiple executions/orders or Execution Price (Gross Price per share for single execution). |
| Currency | Currency of Avg. Price. Should be the currency of the local market (exchange) where the trade was executed. |
| Gross Amt. | Expressed in the same currency as AvgPrice: Gross Amt = Quantity * AvgPrice |
| Commission | Commission value for block trade. Default commission value and type are specified for a client during the client profile setup. |
| Commission Type | A drop-down menu with the following options: No Commission, Absolute, Percentage, Per Share. |
| Trade Date | The Date when the trade was executed |
| Settle Date | Depends on Security Type (e.g., Stock) and Settlement Type (e.g., REGULAR) - Should be defaulted and come from the back-end. |
| Order ID | Trade OrderID - Unique for a trade. |
| Lehman OrderID | Order ID assigned by LB back-end if order(s) were electronically delivered and executed. |
| Client Ref. | A unique for a trade client specified reference number. |

TABLE 3-continued

| FIELD NAME | FUNCTIONALITY |
| --- | --- |
| Allocation Status | Allocation Status (Pending, Received [not yet processed], Accepted, Partial Accept, Rejected, Allocated, Partially Allocated, Cancelled, Replaced). |
| Comment | Free format text field for client |
| Allocation Time | Date/Time when allocation is generated |

The bottom portion of the display in FIG. 9 is an Orders blotter. The Orders blotter displays a list of orders that are eligible for allocation. An order becomes eligible when some or all of the order quantity has been executed. Eligible orders may be grouped into a block when their trade characteristics match. Examples of trade characteristics on which orders may be grouped include side, symbol, symbol type, trade date, settlement date, and commission type. A Client Reference field may be used as an additional matching criterion if entered during order placement. The user may select individual compatible orders and create an order group by clicking the "Group Selected" button. A grouping view may be toggled by clicking on either the "Group All" or "Un-Group" button in the Orders blotter. The plus (+) icons at the right of each row expand order groups to display individual orders when selected and, at the order level, expand orders to display individual executions.

An allocation block may be created by selecting individual orders or groups of orders. A "Block All" button creates allocation blocks from all eligible orders in the Order blotter. An allocation block is created for each group and for each ungrouped order. A "Block Selected" button works identically to the Block All button but operates only on orders and groups that have been selected. A "Single Block" button tries to group the selected orders and create a single allocation block. If any of the selected orders or groups contain trade data incompatible with other selected items, the operation will not be successful.

Orders and groups may also be dragged using the mouse from the Orders blotter to the block allocation blotter. If dropped on empty space in the Orders blotter, a new block is created. If dropped on an existing and compatible block, the dropped data is added to the existing block. The right-click context menu may also be used to Copy/Paste orders and groups with compatible characteristics.

A "freeform" block may be created by clicking the "New Freeform" button. The freeform block enables the user to manually enter block level data. A "Copy Freeform" button may be selected to populate block-level data from existing allocation blocks.

Once orders are blocked, they will disappear from the "Orders to Allocate" window and appear in the "Allocation Blocks" window. All relevant block-level information will be taken from the trades to populate the allocation block data fields.

Figure 10:
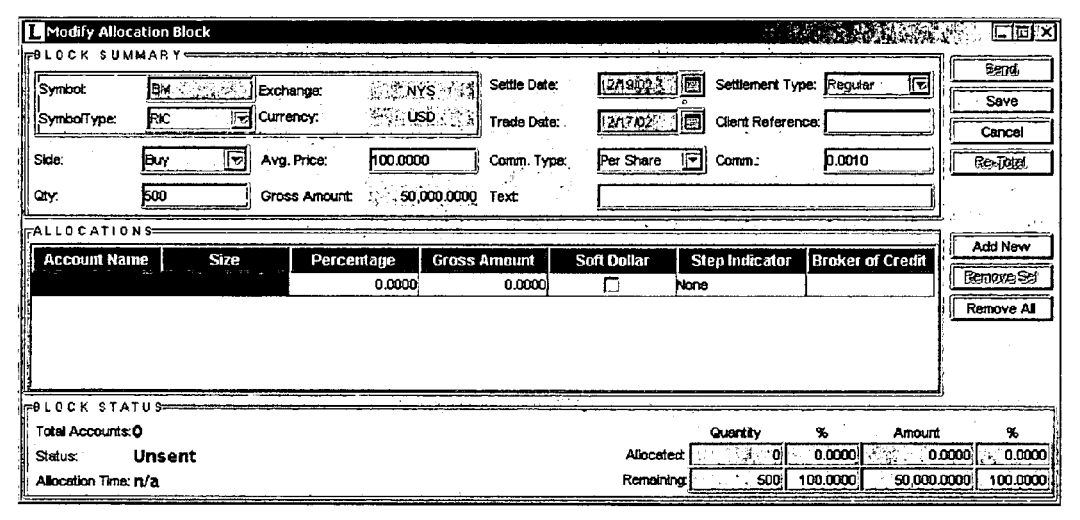

After the allocation block is created, allocation details may be entered or modified for the block by double-clicking on the allocation block or selecting it and clicking the "View/Allocate" button. A modify allocation block window is displayed enabling the user to enter the appropriate information. FIG. 10 is an illustration of a modify allocation block window displayed in some embodiments of the present invention. In FIG. 10, block-level information is displayed in a block summary section. Fields in the block summary section may be pre-populated by information from the orders in the block. Table 4 lists and describes the data elements associated with the allocation details.

TABLE 4

Data Elements Associated with Allocation Details

| COLUMN NAME | FUNCTIONALITY |
| --- | --- |
| Account Name | Account Name |
| Account Code | Unique account number |
| Size (AllocShares) | Number of shares allocated for the account. Not more than the total number of shares in a block. |
| Percentage | Percentage of total number of shares allocated. Not more then 100%. |
| Price (AllocPrice) | By default equals to Block Trade Average Price. |
| Gross Amt. | Gross amount Allocated for the account = Price * Size |
| Commissions | Commission value for the allocation will automatically default to commission value specified on a block trade level but could be changed here for every individual allocation. |
| Commission Type | Following options are allowed: No Commission, Absolute, Percentage, Per Share. |
| Total Commissions | Total commission value for the allocation. For example, if Commission Type = Per Share => Total Commissions = Size * Commissions |
| Misc. Fee | Misc. fee value (different from commissions) - comes from brokerage back-end. Note that it could be multiple Misc. fees for each allocation. |
| Misc. Fee Type | Regulatory (SEC), Exchange Fee, Tax, Markup, etc. - comes from LB back-end. |

TABLE 4-continued

Data Elements Associated with Allocation Details

| COLUMN NAME | FUNCTIONALITY |
|---|---|
| Total Misc. Fee | Total Misc. Fee value for the allocation. |
| Net Money | Net Money for the Allocation = Price * Size − Commission − Total Misc. Fee if a Sell; Price * Size + Commission + Total Misc. Fee if a Buy. |
| H/S (ProcessCode) | [H]ard of [S]oft dollar arrangement. Default is [H]ard. |
| Comment (AllocText) | Free format text related to this AllocAccount |
| Broker Of Credit (Commission Directed To:) | Identifies a broker other than executing broker designated to receive the commission. BOC is populated using the common directory of brokers. Client should also be able to enter BOC's name in a free text format. Default is empty. |
| Reason | Reason to direct commission to BOC. |
| Stepout (ProcessCode) | Stepout indicator - indicates whether the allocation is stepout.- check mark the Step Out box for each stepped out allocation. Default is not checked - no stepout. Step Out Trade: A Trade where the client instructs the executing broker (dealer) to allot a portion of the trade to other broker/dealers (the step out brokers) determined by the client. The client generally allots these trades to satisfy soft dollar arrangements with the step out brokers. |
| Reason Code | Step Out Reason |
| Send To | Send To (Broker) is populated with the step-in (non-executing) broker who will receive the automatically generated step in trade. It is a drop-down menu with the common directory of brokers. Client should also be able to enter a step-in broker's name in a free text format. Default is empty. |
| Credit | This field identifies the non-executing broker who ultimately receives the commission on the allocation. May be identical to Send To broker. |
| Total Accounts | Total number of allocation accounts available to user. |
| Allocated | Contains two fields: Qty and %. Total number and percentage of shares allocated. |
| Remaining | Contains two fields: Qty and %. Total number and percentage of shares remaining for allocation. |
| Allocated Amt. | Contains two fields: Value and %. Value is the total value allocated = Size1 * Price1 + Size2 * Price2 + . . . . % is the percentage of block trade gross amount allocated. |

Individual account allocations may be entered directly into the table in an Allocations section of the modify allocation block window. Additional rows are created by clicking an "Add New" button or pressing the <ENTER> key in any cell in the last existing row. Each entry must include an account and a quantity (Size). The quantity may be entered either as an absolute share quantity in the Size column or as a percentage of the total order entered in the Percentage column. Data may also be dragged-and-dropped or copied-and-pasted from an Excel spreadsheet. A Soft Dollar checkbox may be checked to indicate a soft-dollar arrangement. Portions of the commission may be "stepped-out" by setting the "Step Indicator" and specifying a "Broker of Credit."

Allocation details may be saved for further editing using the "Save button or sent directly to the broker/dealer. A "Send" button is enabled when the allocation details match the block-level information. Block level information may be edited manually, in which case the field will display in a different color to indicate that it has been changed. At any time, a "Re-Total" button may be pressed to reset the block-level data to match the details of the orders associated with the block. A Block Status portion of the allocation details window displays information about the total quantities of the block and the status of the allocation details.

The "Send" button becomes enabled when valid unsent blocks are selected. Similarly, the "Cancel" button is enabled when blocks that have been sent and received are selected. Orders associated with blocks that are cancelled will not reappear in the Orders blotter but by selecting a cancelled block and clicking the "Recycle" button a new block is created containing the details of the recycled block and references to any associated orders.

Figure 11:
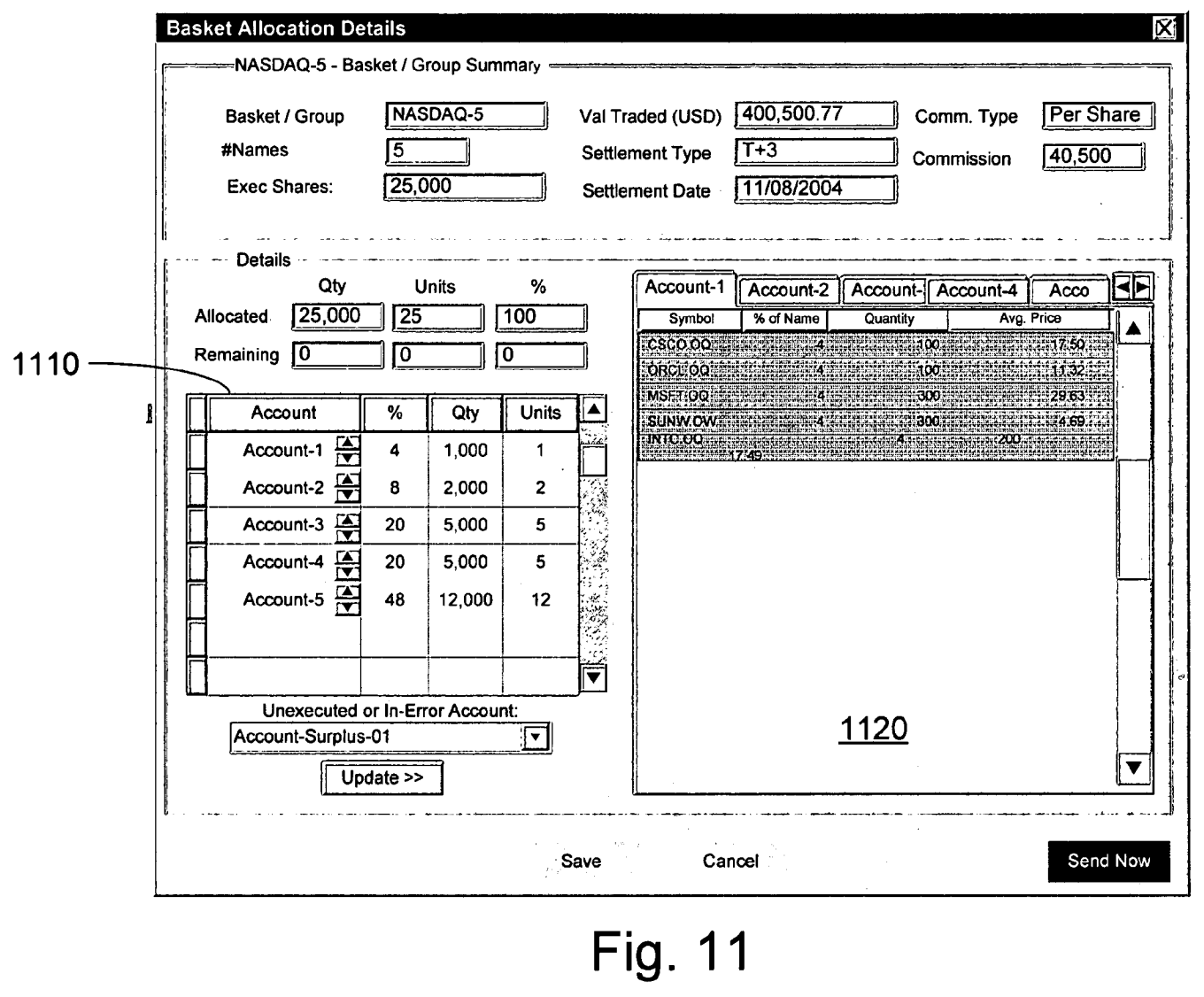

FIG. 11 is an illustration of a basket allocation details window displayed in some embodiments of the present invention. The window illustrated in FIG. 11 may be displayed in response to the user selecting "Allocation Details" on the block's popup menu. The basket allocation details window includes a basket/group summary nugget that displays information about the basket/group. The user may enter a per account unit, quantity, or percentage allocated to each account in a table nugget 1110. For each account in the table nugget 1110, a tab corresponding to that account is created in a securities nugget 1120. The securities nugget 1120 displays the securities that are allocated to the selected account. The user may modify the allocation quantities for each individual security in the account. When the quantities allocated match exactly 100% of the Basket's total shares, a "Send Now" button is enabled and allows the user to send the basket to the OMS.

Unsent blocks may be deleted by clicking a "Delete" button. References to associated orders may be removed by clicking an "Exclude Order" button. Orders may also be dragged out of unsent blocks back to the Orders blotter. The block from which the orders are removed is not be deleted.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A computer-implemented method comprising:
    creating a basket using a client computer by adding one or more securities and a quantity to the basket;
    slicing the basket into a plurality of wave orders using the client computer, each wave order identifying one or more securities in the basket and a wave quantity, wherein a sum of wave quantities over the plurality of wave orders equals the quantity of the one or more securities in the basket, wherein at least certain of the securities in the basket of securities are different securities;
    processing the plurality of wave orders received from the client computer by a backend server in communication with the client computer; and
    directing the processed wave order to an execution venue.

2. The method of claim 1 further comprising allocating the wave order to at least two accounts stored in the client computer.

3. A computer-implemented method comprising:
    providing a client computer and a client database residing on the client computer;
    creating a basket using the client computer by adding one or more securities and a quantity to the basket and storing information characterizing the basket in the client database;
    slicing the basket into a plurality of wave orders using the client computer and storing information characterizing the wave orders in the client database, wherein a sum of wave quantities over the plurality of wave orders equals the quantity of the one or more securities in the basket and at least certain of the securities in the basket of securities are different securities;
    receiving, processing and forwarding a wave order from the client computer to an execution venue by a backend server; and
    sending status information to the client computer.

4. The method of claim 3 further comprising allocating the basket among at least two accounts.

5. The method of claim 4 further comprising storing information characterizing the allocation in the client database.

6. A computer-implemented method comprising the steps of:
    providing a client computer having:
    a basket blotter manager for displaying information to, and receiving information from, a client;
    a basket store manager for managing the storage and retrieval of basket data from a client database;
    and a market data cache containing market data for a stock represented in the client database;
    creating a basket using the client computer by adding one or more securities and a quantity to the basket, the basket blotter manager displaying market data for the one or more securities retrieved from the market data cache;
    slicing the basket into a plurality of wave orders using the client computer, each wave order identifying a security in the basket and a wave quantity, wherein a sum of wave quantities over the plurality of wave orders equals the quantity of the security in the basket, wherein at least certain of the securities in the basket of securities are different securities; and
    sending the wave order to an execution venue for execution of the order.

7. The computer-implemented method of claim 6, further comprising allocating the securities in the basket to at least two accounts.

8. The computer-implemented method of claim 7, further comprising storing allocation information in the client database.

* * * * *

UNITED STATES PATENT AND TRADEMARK OFFICE
CERTIFICATE OF CORRECTION

| | | |
|---|---|---|
| PATENT NO. | : 7,617,148 B2 | Page 1 of 1 |
| APPLICATION NO. | : 11/242422 | |
| DATED | : November 10, 2009 | |
| INVENTOR(S) | : Breslow et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 222 days.

Signed and Sealed this

Nineteenth Day of October, 2010

David J. Kappos
*Director of the United States Patent and Trademark Office*